United States Patent
Wesemeyer et al.

[11] 4,163,217
[45] Jul. 31, 1979

[54] REMOTE LOAD CONTROL SYSTEM

[75] Inventors: Jürgen Wesemeyer, Nüremberg; Georg Haubner, Berg, both of Fed. Rep. of Germany

[73] Assignee: Robert Bosch GmbH, Stuttgart, Fed. Rep. of Germany

[21] Appl. No.: 852,323

[22] Filed: Nov. 17, 1977

[30] Foreign Application Priority Data

Nov. 27, 1976 [DE] Fed. Rep. of Germany ....... 2654026

[51] Int. Cl.² ............................................. H04Q 11/04
[52] U.S. Cl. ......................... 340/167 R; 340/147 SY; 340/168 R; 307/10 R
[58] Field of Search ............... 340/167 R, 168 R, 163, 340/168 B, 147 SY; 307/10 LS, 10 R; 328/72, 75

[56] References Cited
U.S. PATENT DOCUMENTS

| 3,965,366 | 6/1976 | Sumida et al. | 307/10 R |
| 4,055,772 | 10/1977 | Leung | 307/10 R |
| 4,085,403 | 4/1978 | Meier et al. | 307/10 R X |

Primary Examiner—Donald J. Yusko
Attorney, Agent, or Firm—Frishauf, Holtz, Goodman & Woodward

[57] ABSTRACT

To connect cyclically intermittently operating loads to a pulse controlled remote control system, for example having a central system controlling connection of loads on board of a vehicle, such as an automotive vehicle, cyclically operating loads are intermittently connected to the power line, although the main control switch may be constantly connected, thus using the pulse source of the control system, additionally, as the cyclical control element for intermittent connection. A typical load is, for example, a direction or warning flasher in a vehicle, a windshield wiper with intermittent operation, washer-wiper combinations, and the like.

21 Claims, 5 Drawing Figures

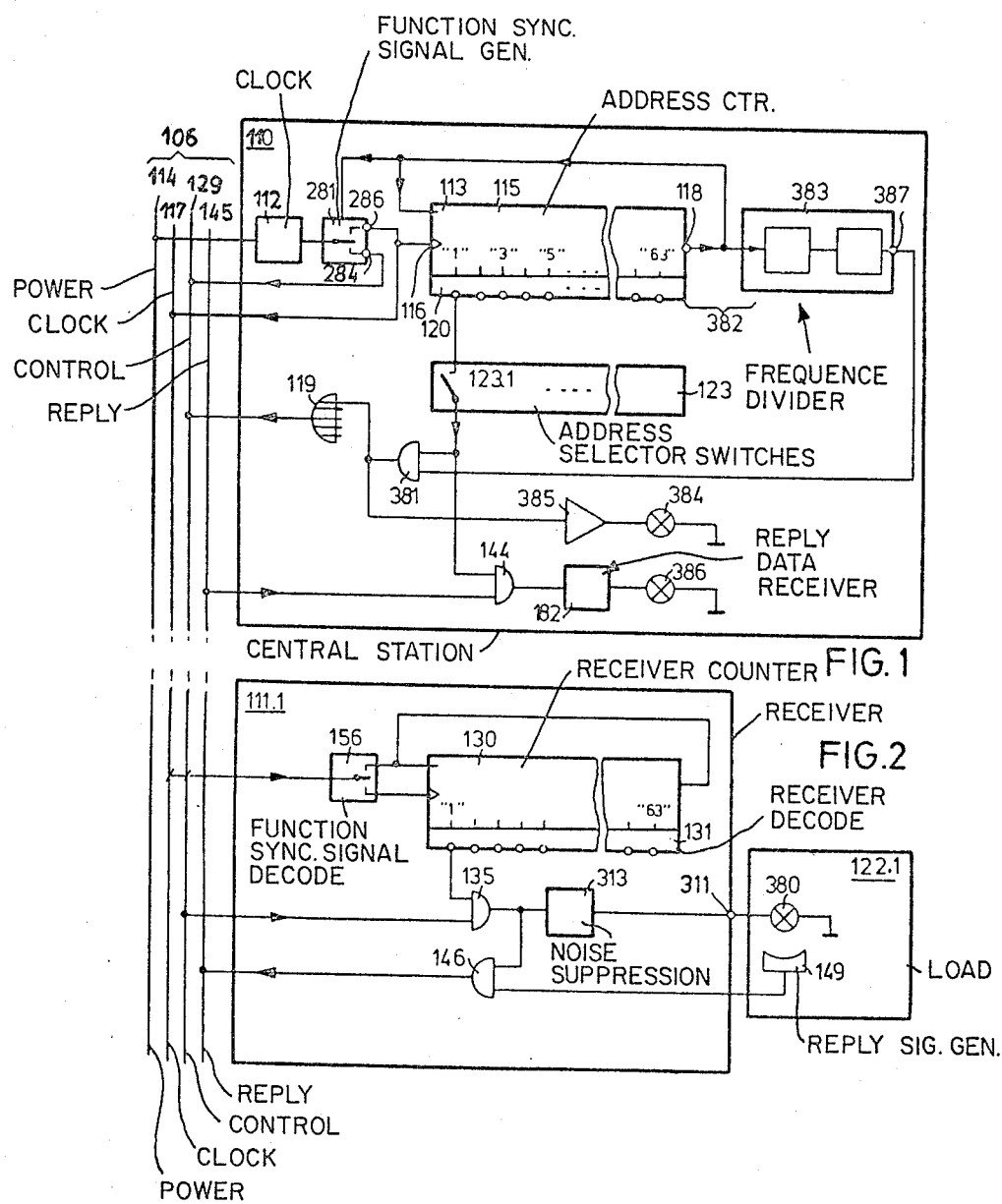

REMOTE LOAD CONTROL SYSTEM

Cross reference to related application and patent, assigned to the assignee of the present application:

U.S. Ser. No. 648,783, filed Jan. 13, 1976, MEIER et al, now U.S. Pat. No. 4,085,403; U.S. Ser. No. 835,180, filed Sept. 20, 1977, WECKENMANN et al; U.S. Ser. No. 836,979, filed Sept. 26, 1977, WECKENMANN et al; U.S. Ser. No. 840,487, filed Oct. 7, 1977, WESEMEYER et al.; U.S. Ser. No. 771,806, filed Feb. 24, 1977, HAAS et al now U.S. Pat. No. 4,107,555; U.S. Pat. No. 4,016,490 WECKENMAN.

The present invention relates to a remote load control system, and more particularly to a remote load connection system for use on board of automotive vehicles.

BACKGROUND AND PRIOR ART

The cross-referenced application Ser. No. 648,783, now U.S. Pat. No. 4,085,403 discloses a pulse controlled remote control connection system for loads distributed at various locations, for example on board of an automobile, in which a ring bus having individual power, clock control and reply buses is connected to a central station and to a plurality of receivers and loads. The central station includes a pulse source connected to the clock bus of the ring bus system, and a cyclically operated counter which transmits switching pulses to the control bus. The receivers have counters therein decoding, in synchronism with the clock pulses received from the clock bus, the pulses on the control bus.

Various loads, particularly in automotive vehicles, have periodic or cyclical operating characteristics. Typical loads are, for example, direction indicator blinking lights, warning flashers, intermittently operating windshield washers, washer-wiper combinations in which windshield washing fluid is sprayed intermittently during, or upon wiper operation, and the like. To provide for the intermittent operation, separate flashers or periodically operating switches have been provided, connected in the power supply of the respective cyclically operating load. These flashers are then permanently connected—when enabled by a control switch—to the power supply and provide intermittent output connection of the respective load to the power supply, typically the battery of the automotive vehicle.

THE INVENTION

It is an object of the present invention to organically integrate periodically operating loads into the functional concept of the remote control system above described, and more particularly to simplify the circuitry therefor and permit, insofar as possible, use of integrated digital circuits, avoiding the use of analog timing circuits and separate intermittently operating power supplies.

Briefly, the periodically or cyclically operating loads connected to the remote control system above described are controlled by their ordinary operating switch which, at its output, is connected through a conjunctive gate to a source of clock pulses, preferably the clock pulses supplying the control pulses for the entire system and frequency-divided to provide the proper operating frequency for the load.

Utilizing a clock source, and specifically the same clock source which also controls the remote control system eliminates the requirement of setting a separate time basis for the operation of periodically or cyclically operating loads. Rather, the time basis for the periodic operation of the loads can be preset by suitable frequency division of the clock pulse frequency. No separate element to generate intermittent control signals or to cause intermittent connection of the load, is necessary since the clock frequency is already available from the clock source of the remote control system. This leads to savings in circuit and switching elements controlling the respective loads and additionally simplifies synchronization of control of the loads with other control programs in the remote control system.

The central station of the system includes a counter. This counter may be used entirely, or as a portion of the pulse frequency divider. Periodic cycles which are longer than the counting cycles of the counter then merely require a suitably dimensioned additional frequency divider or counter, serially connected to the control counter of the central station. This additional counter can be smaller, that is, with a lesser number of counting stages than the main counter.

Drawings, illustrating an example:

FIG. 1 is a highly schematic, simplified and fragmentary block diagram of a central station and illustrating those elements necessary for an understanding of the present invention; for a complete showing of a central station, reference is made to the applications and patent identified above and incorporated by reference;

FIG. 2 is a fragmentary schematic block diagram of a receiver and load which operates intermittently, and connected to the ring bus system; for a full disclosure of a receiver, reference is made to the patent and applications incorporated by reference;

Figure 4:
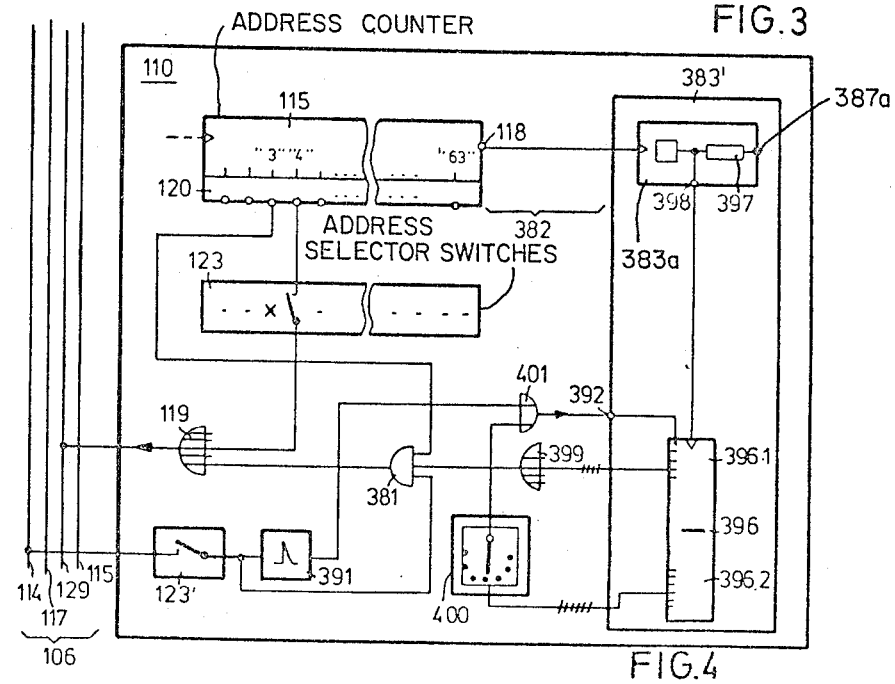
Figure 5:
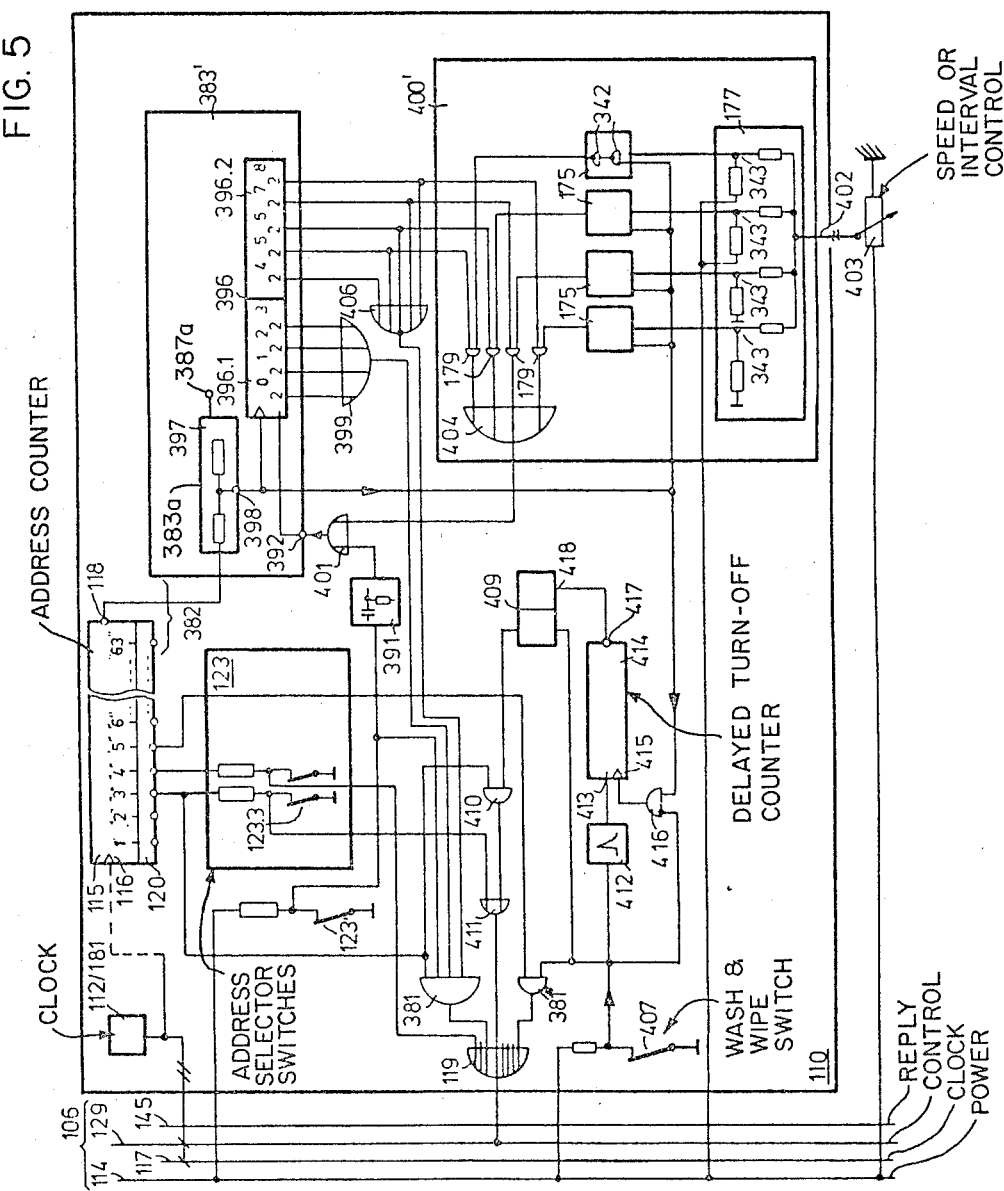

FIG. 4 is a fragmentary simplified diagram of the central station and illustrating another embodiment to control loads operating intermittently; and FIG. 5 is a more detailed and expanded diagram of a portion of the central station to control a load operating cyclically, and selectively in more than one operating condition, for example at either one of two selected speeds, and/or in more than one operating mode, for example, selectively, in wash-and-wipe mode for windshield cleaning of an automotive vehicle.

Referring first to FIGS. 1 and 2, and specifically to FIG. 1: The ring bus system 106 has a power bus 114, a clock bus 117, a control bus 129 and an acknowledge or reply bus 145. When connected to a vehicle, the power bus 114 will carry, for example, battery voltage. A central station 110 (FIG. 1) and a plurality of receivers 111 (FIG. 2) are connected to the bus system 106. The receivers 111 are associated with respective loads, for example receiver 111.1 is connected to control a load 122.1. The central station 110 (FIG. 1) includes a clock source 112, a function synchronization signal generator 281 and an address counter 115. The function synchronization signal generator 281 selectively and intermittently places clock pulses on the clock bus 117 to provide a sequence of clock pulses thereon and then on the control bus 129 to provide a sequence of synchronization pulses. The function synchronization signal generator 281 operates similarly to a controlled transfer switch. Reference is specifically made to the cross-referenced and herein incorporated application Ser. No. 835,180, filed Sept. 20, 1977, Weckenmann et al, in which the function synchronization signal generator and its operation are described in detail. Two sequential sequences of synchronization pulses define, in the gaps between them, the pulses of selection cycle during which clock pulses are applied to the clock bus. The clock pulses on clock bus 117 likewise are applied to the address counter 115, and they synchronize the receiver counters 130 in each one of the receivers 111. The selection of a particular receiver 111.1, for example, from the central station 110 is effected by associating with the specific receiver a predetermined count number or count state of counter 115 and, of course, also of the receiver counter 130. The first count number would be allocated to receiver 111.1, for example. Upon closing of the appropriate address selector switch 123.1 of a group of address selector switches 123, the counter will apply an output signal from the count decode stage 120 thereof to connect an output through an output OR-gate 119 to the control bus 129 of the bus system 106. This switching pulse will be sensed in the receiver counter 130 of the specific receiver 111.1. All the receiver counters 130 in all the receivers step or count in synchronism with the pulses on the clock bus 117. The additional pulse on the control bus 129 will be decoded by the receiver decode stage 131 to which the first count state has been allocated. The coincidence condition of coincidence gate 135, having an AND-function, will be satisfied for the specific receiver 111.1 when a pulse appears on the control bus 129 in synchronism with the occurrence of the count state 1 in the receiver counter 130 of the receiver 111.1. Consequently, the receiver output 311 will be energized, thus controlling the load 122.1 to be connected. A noise suppression or check counter 313 is preferably included between the output of the coincidence gate 135 and the receiver output 311. Reference is made to the cross-referenced and incorporated application Ser. No. 836,979, filed Sept. 26, 1977, Weckenmann et al, for a discussion relating to the details of the operation of such a noise suppression counter. Synchronous counting between the counter 115 in its central station 110 and all of the receiver counters 130 is ensured by the function synchronization signal decoding circuit 156 connected between the input to the receiver counter 130 and the connections to the clock bus 117 and the control bus 129, respectively. When the sequence of function synchronization pulses on the control bus 129, subsequent to the clock pulses on the clock bus 117 occurs, transition between two succeeding selection cycles, and corresponding to the counting cycles of the address counter 115 in the central station, will be sensed. A reset signal for the receiver counter 130 is generated to reset the receiver counter 130 to its initial or start-counting state so that, upon occurrence of the next subsequent first clock pulse during the next subsequent selection cycle, the receiver counter 130 is reliably reset into the start condition.

The clock pulse frequency at the output of clock 112 is preferably so selected that, after operation of any one of the switches 123, the time delay between operation of the switch and the maximum possible time for the counter to reach the appropriate counting state or count number is so small that no significant time lay can be noticed by the user. For example, if the operating switch 123.1 is momentarily operated, the load 122.1 is connected, practically without delay, for the duration of one selection cycle. Continued operation of the switch 123.1 will leave load 122.1 permanently connected.

The system has been described so far with respect to the general case of any load. In accordance with the present invention, the clock 121 can be used to control periodic or intermittent operation of an intentionally intermittently operating load, such as a direction signal blinker, warning flashers, or the like. The system will first be described with respect to a general case of a periodic load, such as a flashing light, for example direction signal or warning flashers, police beacons, or similar loads.

Low-frequency intermittent control of the load 122.1 is obtained, in accordance with a feature of the invention, by providing an additional AND-function gate 381 between the output from switch 123.1 and the OR-gate 119, and controlling the second input of the AND-function gate 381 from an intermittent source. This intermittent source is a frequency divider 382 connected to the clock 112. The coincidence condition of the AND-function gate 381 is satisfied only if the pulses, as determined by the pulse or frequency division ratio of the frequency divider 382 and derived from clock 112 occur, regardless of the fact that switch 123.1 may be continuously closed. The switching pulse to the load 122.1 is applied thereto over OR-gate 119 and on the control bus 129 if, and only if, gate 381 has both its inputs enabled, so that the output 311 at the receiver (FIG. 2) will then be energized.

The frequency divider 382 preferably utilizes the address counter 115 as a part thereof. The overflow or full-count output of counter 115 is connected to a second counter 383 which, preferably, may have a lesser number of count states than address counter 115, that is, it can be dimensioned to be smaller. The auxiliary or additional counter 383 then needs to divide down only the already divided output frequency from clock generator 112, as determined by the number of count positions of address counter 115. This already substantially lowered frequency then can be divided down to the desired frequency required for periodic control of the load 122.1.

The central station 110 (FIG. 1) preferably includes a control lamp 384, connected through an amplifier 385 which is also connected to the output of the AND-function gate 381 to indicate that the load is a flashing load, although the switch 123.1 is continuously closed. Additionally thereto, or instead thereof, a monitoring control lamp 386 can be provided in the central station, which monitors the actual condition of operation of the load 122.1 to indicate that the actual operation of the load really is as commanded, and with the desired cyclical repetition rate. A load reply signal generator 149, for example in the form of a photosensitive semiconductor, or other light-sensitive element, is located adjacent the lamp 380 of load 122.1 to provide an output signal which is connected through an AND-function gate 146 to the reply bus 145. AND-function gate 146 is enabled upon coincidence condition of the AND-function gate 135, that is, control of receiver 111.1 from the first count state plus sensing of proper operation of lamp 380 by transducer or reply signal generator 149. The reply bus 145 will transmit the reply indication to the central station 110; upon sensing the reply coincidence condition, AND-gate 144 will have its coincidence conditions satisfied so that a reply data receiver 182 can be controlled thereby to, in turn, provide an indication by indicator lamp 386. The coincidence condition of AND-gate 144 is determined by operation of the respective address selector switch 123.1 and a reply pulse on the reply bus 145. The lamp 386 in the central station will then flash in the same rhythm as the periodically operating bulb 380. The reply data receiver 182 may include a memory or a holding circuit, as more specifically described in cross-referenced and incorporated application Ser. No. 836,979, filed Sept. 26, 1977, Weckenmann et al.

If the load 122.1, for example, is the left direction signal blinking system, and lamp 380 is one, or the main, signal flasher thereof, then a similar arrangement, with a similar receiver 111 and system 122, is to be provided for the right direction signal indication. The central station 110 would require a separate address selection switch, for example switch 123.2, for control of the right direction signal blinker system. These switches could be operated simultaneously, thus resulting in flashing of both right and left systems and providing a warning output. Additionally, however, a separate operating switch 123a (FIG. 3) could be provided, connected to simultaneously control both direction signal blinking system to provide a combined and single warning flasher switch.

Figure 3:
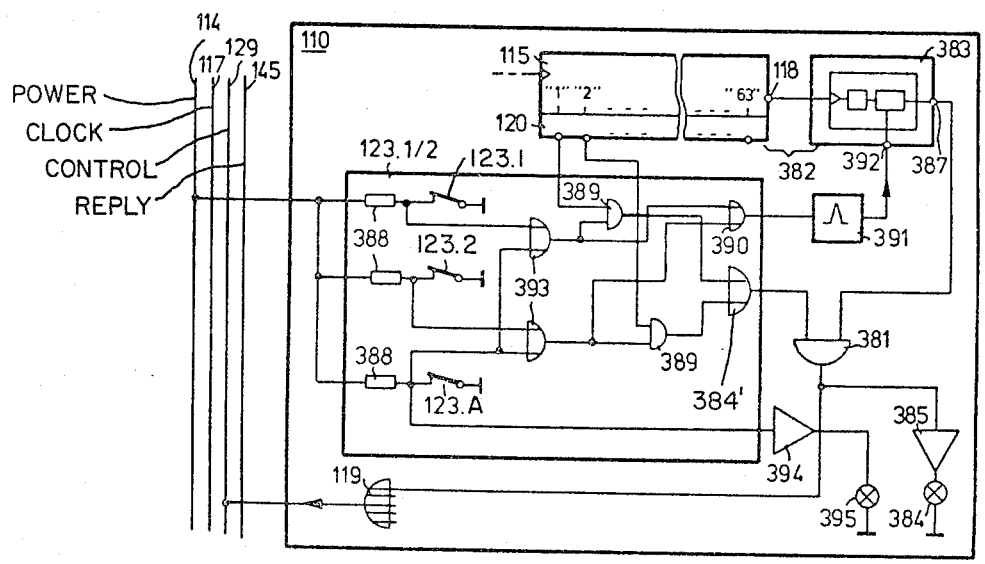
FIG. 3 is a fragmentary and more detailed diagram of a preferred embodiment of the system of FIG. 1 in which the load is an intermittently flashing direction signal system, or warning flashing system of an automotive vehicle.

FIG. 3 illustrates an arrangement in which a switch combination 123.1/2 is provided, having separate left and right direction signal blinker switches 123.1 and 123.2 and an additional warning flasher switch 123a. These switches, to be manually operated, may be any type of mechanically or electrically controlled switch and, for example, may be proximity sensors disclosed, for example, in application Ser. No. 771,806, filed Feb. 24, 1977 Haas et al now Pat. No. 4,107,555, and U.S. Pat. No. 4,016,490. If the switches 123.1, 123.2, 123.a are mechanical switches, then interposition of decoupling resistors 388, serially connected to the power bus 114 is desirable. The switches are connected through the resistors to ground, chassis or reference potential. The junction between the respective switches and the respective resistors are connected through respective buffer OR-gates 393 to respective AND-gates 389, the other inputs to which are connected to the respective 1 and 2 outputs of the address counter 115. The AND-gates 389 thus are enabled if, and only if: (1) the respective switch 123 is open and (2) the counter has stepped to the respective count state associated with the switch and the respective AND-gate 389. When switches 123 are closed, the respective input to the AND-gate 389 is at zero or reference potential. The AND-gates 389 in combination with the common AND-gate 381 of FIG. 3 correspond, together, to the function of the AND-function gate 381 of FIG. 1.

The coincidence condition of the associated AND-gate 389 is satisfied when the respective coordinate switch 123 is open and, then, the AND-function gate 381 will be enabled when, through the division ratio of the voltage divider 382, formed of the address counter 115 and the auxiliary counter 383, the counters have counted to their end state so that the output of the divider counter 382 at terminal 387 is enabled. The OR-gate 119 will then have a connection pulse applied thereto to further control the control bus 129. Simultaneously with opening of the associated switch 123, an OR-gate 390 is enabled to control a pulse source 391 which is connected to the reset input 392 of counter 383 to reset the counter 383 to its start or zero state. The pulse source 391, in its simplest form, may be a C/R differentiating circuit, providing a sharp output pulse upon being energized. The output terminal 387, upon suitable overall dimensioning of the frequency division of the frequency divider 382, and an appropriate clock frequency of clock 112, will then provide an output frequency to the load of about 90 Hz with an ON/OFF ratio, or a duty cycle of about 1:1. The monitoring lamp 384 will light in the same rhythm as the operation of the respective blinker lamps when either one of the "right" or "left" switches 123 is opened. Two such lamps 384 can be provided connected, for example, through a respective AND-gate, having one input derived from the output of AND-gate 381 and another input from the output of the respective AND-gate 389, that is, from the respective inputs to OR-gate 384'.

A third combined warning signal switch 123a is provided within the left-right direction signal blinker switch unit 123.1/2. Switch 123a energizes both AND-gates 389 through OR-gates 393 so that, when the counter reaches count state number 1 as well as at count state number 2, a switching pulse will be provided to the control bus 129. As indicated in FIG. 3, upon operation of switch 123a, signal lamp 395 will light continuously, being energized through an amplifier 394. The signal lamp 395 will not be operating intermittently, whereas the lamp 384 (or its replacement by two separate "right" and "left" lamps) will.

The duty cycle, or ON/OFF ratio, or flashing frequency, in the arrangement of FIG. 3 is determined by the respective dimensioning of the pulse division frequency of the frequency divider 382, and particularly of that of the auxiliary frequency divider 383. The frequency of flashing and duty cycle thus are fixed.

In various installations it is desirable to permit operation of a periodically or intermittently operating load with different ON/OFF ratios, that is, with duty cycles and repetition rates, both with respect to ON time as well as with respect to OFF time, and with respect to repetition of different duration. An example of such a load is an intermittently operated windshield wiper of a vehicle, typically an automotive vehicle. A system permitting such operation and utilizing the basic components already present in an installation of this type is shown in FIG. 4, to which specific reference will now be made.

Divider 82 (FIG. 4) includes the address counter 115, as before, and the composite auxiliary counter 383' which is built up of a counter 383a, which is similar to counter 383 of FIG. 3, and a two-stage stepping counter 396. To provide a suitable stepping frequency or stepping pulse train for the counter 396, it is desirable to connect it ahead of the last stage 397 of counter 383a, for example to an intermediate terminal 398, thus permitting use of the same counter element for the auxiliary counter regardless of whether the embodiment of FIG. 3 or the embodiment of FIG. 4 is selected. The intermediate terminal 398 is shown, symbolically, intermediate of two counter stage groups, of which the last group is the element 397. If the frequency at the intermediate terminal 398 is too high, the final output terminal 387a, corresponding to output terminal 387 of FIG. 3 can be used as the output terminal to control stepping of counter 396.

The counter 396 is operated under control of an interval switch 123'. This switch is under operator control and closed if the operator desires to select interval operation. Upon closing of switch 123', a pulse generator 391 which, for example, may be an R/C element to provide a differentiated needle pulse, is connected through OR-gate 401 to the reset terminal 392 of the stepping counter 396 to reset the stepping counter 396 to its initial count state, for example to count zero. The counter 396 will then start to count in accordance with pulses applied thereto from terminal 398, as shown or, alternatively, from terminal 387a. One input of AND-gate 381 is enabled so long as any one of the count stages of the counter 396.1 has a count signal appear thereat. OR-gate 399 has its various inputs connected to sequential selected stages of counter 396.1. If the appropriate selection switch 123' continues to be operated, AND-gate 381 will remain enabled and will control OR-gate 119 to place a control pulse on the control bus 129, if, at the same time, a switching pulse is derived, for example as shown, from the third count stage of counter 115, connected to the address counter output 120 and then through the AND-gate 381. The embodiment of FIG. 4 shows the condition in which the third count stage of the address counter has been selected to provide for interval control.

When the first stage 396.1 of the two-stage stepping counter 396 has counted, that is, when the OR-gate 399 does not receive any output signals anymore, AND-gate 381 will block, since the coincidence condition thereof no longer prevails. Thus, even if counter 115 reaches the count state "3"again, no control signal will be placed on bus 129 since AND-gate 381 is blocked.

The interval pause, during which the coincidence conditions of the AND-gate 381 are not fulfilled, is determined by a selection circuit 400 connected to the second stage 396.2 of the two-stage counter 396. Selection stage 400, in its simplest form, is a manually operated selector switch which is connected to selected count stage outputs of the second portion 396.2 of counter 396. Appearance of a signal at a selected stage, connected by the selector switch 400, establishes a reset circuit from the selected count stage of the second portion 396.2 through selector switch 400 and OR-gate 401 to the reset input 392 of the stepping counter 396, which resets the stepping counter 396 and again permits counter 396 to start counting, thus placing a signal on OR-gate 399 which then, in turn, enables AND-gate 381, provided the interval selector switch 123' continues to be closed, and the address counter 115 has reached, again, count stage "3". The pause time of the interval selection can be differently obtained; in accordance with a variation, a selector switch similar to selector switch 400 can also be connected to the OR-gate 399 to vary the number of count stages of the first counter section 396.1 through which the counter 396 can count while still providing an enabling signal to AND-gate 381. Thus, the ON time of the respective load can be controlled by such an additional selector, with the OFF time being, for example, fixedly connected to a selected count stage of the second portion of the counter 396.2 or, if desired, through a second OFF time selector using the circuit illustrated in FIG. 4 with the selector 400.

Thus, the ON time and the OFF time of the load 122 (FIG. 2) can be selected in any desired duty cycle.

The switch 123', commanding interval selection, is connected to the power bus 114 and has only a single output terminal so that it can be readily physically located near or adjacent the address selector switches 123.

Embodiments of FIG. 5: The central station of FIG. 5 differs from the embodiment of FIG. 4 in that the interval or pause time is manually controlled by a potentiometer 403 which is connected only by a single cable 402 to the central station, and otherwise is connected to the power bus and to the reference, chassis, or ground connection. This arrangement has the advantage that control of the interval can be obtained by merely connecting a single wire 402 to the central station to provide for control of the duty cycle of the interval-operated load. The connecting cable 402, connected to the tap or slider of potentiometer 403, is further connected to the control switch 400' which, functionally, corresponds to the switch 400 of FIG. 4. This solution is particularly advantageous since the cost of wiring is reduced and, further, the probability of malfunction is decreased, particularly if the manually operated control element 403, namely the potentiometer, is spatially separated from the central station which includes the electronic and logic circuitry. Thus, the potentiometer 403 may be located on a steering wheel stalk on which a number of control switches are located, the electronic circuit components of the central station 110 being positioned in a compact electronic control module located, for example, behind the dashboard of a motor vehicle.

The selection of specifically determined output stages of the second counter stage 396.2 of the stepping counter 396 is obtained by connecting the outputs from stages 396.2 each to an AND-gate 179, the second input to which is controlled by comparator stages 175. The comparators 175, preferably, comprise a series circuit of two COS-MOS gates 342, connected to a voltage divider circuit 177 of respectively different voltage division ratios for each one of the gates 342.

Cross-referenced and incorporated U.S. patent application Ser. No. 823,979, filed Sept. 27, 1977, Weckenmann et al, contains a detailed description of a comparator circuit using COS-MOS gates connected to a voltage divider. Briefly, the input gate 342 of the COS-MOS gate pairs are connected to different voltage threshold levels by suitable selection of the voltage division ratio of the resistors of the voltage dividers 177, so that the voltage level at the tap points 343, connected to the respective input gates 342, will vary. As the voltage at the slider of speed or interval control potentiometer 403, and connected over line 402 to the voltage dividers 177 increases, a larger number of comparator stages 175 will have output signals applied thereto since the voltage supplied to the voltage divider 177 has increased. Four voltage divider resistor units are shown within the group of voltage dividers 177. A larger or lesser number can be used, depending on the desired degree of accuracy of analog position of the tap point or slider of the speed control potentiometer 403, as reproduced by the actual control effected by the then digital output from the gates 175. The second input to the gates 175 is obtained from the output of the auxiliary counter 383.a, that is, from count output terminal 398 or 387a, as desired.

The two-stage stepping counter 396 can be a decimal counter or a binary counter. As illustrated in FIG. 5, the counter is a binary counter. OR-gate 401 controls the reset input 392 of counter 396 of the counter unit or group 383', and terminates the pause time when OR-gate 404 has an output signal. OR-gate 404 is connected to the outputs of the AND-gates 179. OR-gate 404 has an output signal when that one of the AND-gates becomes enabled which is associated with the lowest value of the count output stages of the second stepping counter portion 396.2 which carries additionally an output signal derived from a respective comparator 175.

Changing the position of the tap or slider on the speed or interval control potentiometer 403 changes the voltage at the connecting line 402. If the slider 403 is so set that the next lower valued binary output position is interrogated, then the previous interval time is halved.

The COS-MOS gates could be operated merely from the input derived from the tap points 343 of the voltage divider group 177. Connecting them, additionally, with an input AND function from the output of the first counter portion 383a, decreases losses in the gates 342 since they are then interrogated only in synchronism with count pulses being applied to the input of counter 396, that is, they are interrogated only when counter 396 is counting.

FIG. 5 illustrates another feature possible in accordance with the present invention. Many windshield wiper installations have multi-speed motors, for example two-speed motors. Switch 123.3 controls one speed, for example slow speed, and switch 123.4 controls the other, then the high speed. Thus, switch 123.4 provides switching pulses for high-speed operation of the windshield wiper to control bus 129 of the ring bus system 106 to control the receiver 111 (FIG. 2) and load 122, having a wiper motor with relay control to operate in the fast mode, whereas switch 123.3 controls the motor to operate in the slow mode.

FIG. 5 illustrates an arrangement in which, upon operation of switch 123', interval control of the wiper is commanded, the pause between wiper operations being controlled by the setting of the slider of speed or interval control potentiometer 403. The wiper speed is automatically controlled to be slow speed. Upon operation of switch 123', the count output stage "3" of the address counter 115 is connected over AND-gate 381 to the OR-gate 119 so that the wiper motor is commanded to operate at slow speed, by permitting enabling of the OR-gate 119 to provide the appropriate control pulse on control bus 129, if and for so long as the coincidence conditions of the AND-gate 381 are fulfilled. Conduction of the OR-gate 399, connected to the first stage 396.1 of the stepping counter 396, is indicative that the counter 396.1 is counting. An output signal from NOR-gate 403 indicates that the second stage 396.2 of the stepping counter has not yet been reached. This additional "NOR" gate is a safety or interlock feature.

The circuit of FIG. 5 additionally permits wash-wipe operation of a windshield cleaning system in a vehicle, typically an automotive vehicle. This circuit is enabled by operation of a WASH-AND-WIPE switch 407 which, physically, can be located adjacent the address selector switches 123.3 and/or the interval switch 123'. When the switch 407 is open, a 1-signal is applied to the input of an AND-gate 381'. The coincidence condition of the AND-gate 381' requires counting by the address counter 115 to the fifth count position. Thus, AND-gate 381' is enabled once during each count cycle of the address counter 115. Each time the address counter 115 reaches the fifth count stage, a switching pulse is applied over OR-gate 119 to the control bus 129. A receiver 111.5 (not shown; and in principle similar to the receiver 111 of FIG. 2) is then controlled, and connected to a load forming a windshield washer spray pump (not shown). Thus, each time address counter 115 passes through count stage 5, the pump will be enabled and provide a spray of washing fluid to the windshield, so long as switch 407 is operated. Thus, switch 407 correspond in function to an operating switch 123.5. This function is the operation of the washing fluid pump. Switch 407 has the additional function, however, of also controlling the windshield wiper to then clear the windshield which has been sprayed with washing fluid.

Simultaneously, and upon operation of the switch 407, a bistable flip-flop (FF) 409 is placed in SET condition. FF 409 provides an enabling input to AND-gate 410, the second input of which is directly connected to the output from the third count stage of address counter 115. It will be recalled that the third count stage of the address counter 115 controlled through a suitable receiver 111.3, operation of the windshield wiper motor at slow speed—not specifically shown in the drawings—but obvious from a consideration of FIG. 2. During the time that bistable FF 409 is SET, a selection cycle will be applied through AND-gate 410 and OR-gate 411 to the OR-gate 119 to control the respective receiver 111.3 by applying a corresponding control pulse to control bus 129. Thus, for the duration of operation of the wash-and-wipe switch 407, cleaning fluid is sprayed on the windshield and, simultaneously, the washer motor is operated at low speed, since both the third as well as the fifth count stages of address counter 115 will provide control output functions, the third to operate the washer motor at low speed and the fifth to enable AND-gate 381' to provide for washer operation.

It is undesirable to cease the wiper operation immediately upon cessation of washing, that is, to dry off washing fluid which has been sprayed. Thus, a delay counter 414 is provided to insure delayed turn-off of the wiper motor, after washing has ceased.

Upon operation of the switch 407, a pulse source 412, for example a C/R differentiating element similar to element 391, provides a single reset pulse to the reset input 413 of delay counter 414. The count input of delay counter 415 is connected through an inhibit gate 416 to the intermediate tap point output 398 of the auxiliary counter 383'. No count pulses can be applied to the delay turn-off counter for the duration of the operation of the switch 407, however, since the inverting, or inhibit input to inhibit gate 416 will be enabled if switch 407 is open so that, in effect, gate 416 will be blocked. When the switch 407 is closed, thus terminating the wash-and-wipe operation, AND-gate 381' will have a 0-signal applied, thus blocking transmission of output pulses from the fifth counting stage of address counter 115. FF 409, however, remains SET and thus switching pulses associated with the third counting stage of counter 115 will continue to be applied to the control bus 129 to control the wiper motor at low speed by enabling AND-gate 410 and hence OR-gate 411 and OR-gate 119.

The delay turn-off counter 414 will start to count. Upon termination of operation of the switch 407, that is, upon closing thereof, a 0-signal is applied to the inverting input of inhibit gate 416, which satisfies the coincidence conditions of the count input 415 of the delay turn-off counter 414, which will then start to count in synchronism with pulses derived from the output 398 of auxiliary counter 383'. The output for counting of the counter 415 can also be taken from other sources of pulses, for example from the input of counter 383a, or from terminal 387a. Counter 414 thus will count in synchronism with such divided clock pulse frequencies from clock source 112 as are applied to the count input 415. When counter 414 has counted to its full count stage, an output signal will be derived from its output terminal 417 which is applied to the RESET terminal 418 of FF 409. FF 409 will then reset, thus blocking AND-gate 410 and disconnecting command or control pulses on control bus 129 for the wiper motor. The number of count stages in the delay turn-off counter 414 determines the delay time of the load 122 (FIG. 2) which was enabled upon operation of switch 407, in this case the wiper motor at low speed. The time basis for the delayed turn-off time is obtained by frequency division, again by using the address counter 115 and at least a portion of the pulse frequency divider 383' to provide a frequency-divided count control pulse from clock 112. Thus, for delay turn-off counter 414, the frequency divider 382 formed by the address counter 115 and such other counters as are connected thereto can function as a count stepping pulse source, at suitable frequencies, to provide suitable delay times.

Use of a multi-stage auxiliary counter, including elements 383 (FIG. 1), 383a, 396 permits great flexibility in timing of intermittent operations, and additionally timing of delayed turn-off operations. The auxiliary counters can be dimensioned with smaller numbers of counts by connecting them, serially, to the address counter 115, thus incorporating the address counter 115 as part of the frequency divider from the clock source. The connection at the respective stages of the address counter and the number of stages of the auxiliary counters can be selected in accordance with suitable timing intervals, desired by users of the respective controlled loads. The timing can be obtained readily by suitable decoding of the outputs of the counters, using AND-gates to determine when a specific count stage of any-one of the counters has been reached. Resetting of the counters can then also be obtained, logically, upon the counter continuing to count to a predetermined count state, or upon occurrence of another event, for example manual operation of a controlled switch. Reset pulses can be transmitted by including a differentiating element, such as a C/R circuit in the connection of a switch to the counter to provide a pulse of appropriate polarity to effect the desired counter operation when the switch is operated.

The selection of count intervals in intermittently operating devices, such as, for example, an intermittently operated wiper motor, can be done manually by connecting a manual stepping selector switch to count outputs of a counter; it is simpler, however, with respect to wiring in a motor vehicle, and thus more economical to electronically sense a selected position by connecting the interval control potentiometer 403 simply by a single control wire to an analog-digital converter formed by the voltage dividers 177 and gates 175, 179. This system is explained in application Ser. No. 823,979, referred to above, published as German Disclosure Document DT-OS 25 13 323. This solution permits integrating all counter operations at one spatial location, for example in the central station, and then requires only a single one-line conductor from the control module to the control potentiometer 403.

With only minor additions of logic gates it is then possible to additionally simultaneously control washer-wiper operation and, with a delay counter, which may be a separate element or time-shared with already existing counters, to provide for delay turn-off of a wiper motor. Thus, the delay turn-off counter 414, by use of suitable logic gates could, physically, be one of the counters 383a or 396, or one of the count stages 396.1, 396.2, at the cost of suitable logic AND-gates and OR-gates to provide for isolation of the counter functions at the different times when the respective counter is needed for its respective functions. The choice of whether to provide an additional element or additional logic circuitry will depend essentially on the economics of construction of the control circuitry.

Various changes and modifications may be made, and features described in connection with any one of the embodiments may be used with any one of the others, within the scope of the inventive concept.

We claim:

1. Remote control system for selection of at least one periodically or cyclically operating load of a plurality of selectable switchable loads (122) from a central station (110) connected together by a ring bus system (106) wherein the bus system (106) includes a power bus (114), a clock bus (117) and a control bus (129);
wherein the central station includes
a clock source (112),
load address means (123) including selector switches (123.1 . . . ) to select connection of a selected load (122) to the power bus (114), and
means (115) providing control signals synchronized with clock pulses from the clock source for addressing loads in accordance with a selection of the load addressing means;
and wherein at least one of the loads is a periodically or cyclically operating load (122.1) requiring cyclical intermittent power from said power bus (114), said at least one load (122) including
a load control receiver,
and a decoding stage (130, 131, 135) forming part of said load control receiver (111) and being connected to both said clock bus (117) and said control bus (129) to decode address command signals on the control bus (129) appearing in synchronism with the clock pulse on the clock bus (117);
and wherein, in accordance with the invention,
the central station further includes cyclical pulse generation means (112, 382)
and coincidence means (381) having its input connected to both said cyclical pulse generation means and the specific selector switch (123.1, 123.1/2, 123') controlling said at least one periodically or cyclically operating load (122.1) to control connection of said at least one cyclically operating load to the power bus in accordance with the pulses derived from said cyclical pulse generation means.

2. System according to claim 1, wherein the cyclical pulse generation means comprises
said clock source (112) and a frequency divider (382) connected to the clock source and providing a clock subfrequency for said intermittent operation.

3. System according to claim 2, wherein the means providing said control signals comprises an address counter (115), said address counter forming part of the frequency divider (382).

4. System according to claim 3, wherein the frequency divider includes a further divider counter (383) connected to the output of the address counter (115).

5. System according to claim 4, wherein the further divider counter (383) has a reset input (392);
and a dynamic coupling element (391) connecting the load address means (123.1) associated with said at least one periodically or cyclically operating load and the reset input (392) of the further divider counter to insure resetting of the further divider counter before operation thereof upon connection of said at least one load.

6. System according to claim 4, wherein said at least one load comprises automotive left turn - right turn flashing signal lights;

and wherein said load address means (123) includes two selector switches (123.1, 123.2) connected to control, respectively, the left turn and right turn signal lights;

the central station includes a single frequency divider for all said loads;

and logic means (389/381) are provided selectively interconnecting the single frequency divider and the selector switches to control the respective loads, as commanded by selective operation of said selector switches.

7. System according to claim 6, further comprising a warning flasher control switch (123a);

and combining logic means (393) interconnecting said flasher control switch and the logic means to provide for combined control of both the right turn flasher and left turn flasher.

8. System according to claim 7, further comprising a warning flasher operation control indicator (395) connected to and controlled by said warning flasher control switch (123a).

9. System according to claim 2, wherein (FIG. 4) the load is an intermittently operating load;

the frequency divider (382) including a two-stage stepping counter (396);

and logic gate means (381) connecting a selected load address switch (123.3) of the load address means (123) to the outputs of one stage of the stepping counter, the reset input of said two-stage stepping counter being connected to the output of the second stage thereof, to provide for energization of said logic gate means during stepping of the counter through one stage and de-energization thereof during stepping of the counter through the second stage, thereby providing said interval operation.

10. System according to claim 9, further including a selector switch (400) connected to the outputs of the second stage to permit selection of the number of counting steps of the stepping counter when it is counting in the second stage, and thus selection of the interval between energization of said logic gate means.

11. System according to claim 10, wherein said intermittently operating load comprises a windshield wiper of an automotive vehicle.

12. System according to claim 9, wherein at least the second stage (396.2) of the two-stage stepping counter is a binary counter.

13. System according to claim 9, wherein (FIG. 5) the two-stage counter comprises two serially connected binary counters;

an OR-gate (399) connected to the count outputs of the first stage (396.1);

a NOR function gate (406) being connected to the count output stages of the second stage (396.2) and then through said logic gate means (381);

and interrogation logic means (179) being connected to the reset input of the further divider counter (383) and selectively enabled to provide for selective resetting of said further divider counter.

14. System according to claim 13, wherein said interrogation logic means comprises AND function gates (179) having their respective inputs connected to the count outputs of the second stage (396.2) of the stepping counter (396) and, respectively, to differentially voltage controllable input stages (175) to provide for differential enabling of said AND-gates gates in accordance with the differential control thereof;

and voltage control means (403) selectively applying controlled voltages at selected levels to said differentially voltage controllable means (175).

15. System according to claim 14, wherein the voltage controllable means comprises two COS-MOS gates (342), serially connected;

a plurality of voltage divider circuits (177), connected to said voltage control means (403) to provide selectively different voltages to said COS-MOS gates (342) in accordance with the setting thereof, and to control the response threshold thereof, the outputs of said gates forming one input of said AND function interrogating gates (179) connected to the count output stages of the second stage (396.2) of the stepping counter.

16. System according to claim 15, wherein additionally one AND-function input of each one of the pairs of COS-MOS-gates (342) is connected in parallel with the count pulse input of the stepping counter (396).

17. System according to claim 1, wherein the load (122.3) is a delayed turn-off load;

said system further including a bistable stage (409) connected between the respective load address means (123) associated with said delay turn-off load, the bistable stage being set upon connection of said load;

and a delay turn-off counter (414), the delay turn-off counter being connected to the reset terminal of said bistable stage and delaying resetting of said stage, and hence disconnection of said load after the counter has counted through its delay time, said counter being enabled to count upon disconnection of said address means to provide for continued operation of said load during the counting of the delay counter.

18. System according to claim 17, wherein said load comprises a windshield wiper of an automotive vehicle to permit continued operation of the wiper motor after the load address means has discontinued selection of said wiper as an addressed load.

19. System according to claim 17, wherein (FIG. 5) said load address means includes a selector switch (407);

a dynamic coupling element (412) connected to the reset input (413) of the delay counter, the count output (417) of the delay counter (414) being connected to the reset input (418) of the bistable stage (409);

and means (416) inhibiting counting of the delay counter until the switch (407) has been operated to disconnect said delayed turn-off load.

20. System according to claim 1, wherein said load address means includes a windshield washer-wiper switch of an automotive vehicle, commanding automatic energization of the windshield wiper motor for limited wiper operation and operation of a spray pump for windshield washing, and a timed holding circuit (414) is provided commanding continued operation of the wiper after the washing pump has ceased operation.

21. System according to claim 20, wherein said timed holding circuit comprises a counter (414) connected to start counting upon release of said switch (407) to control continued operation of the wiper for a limited time period.

* * * * *